Figure 1:
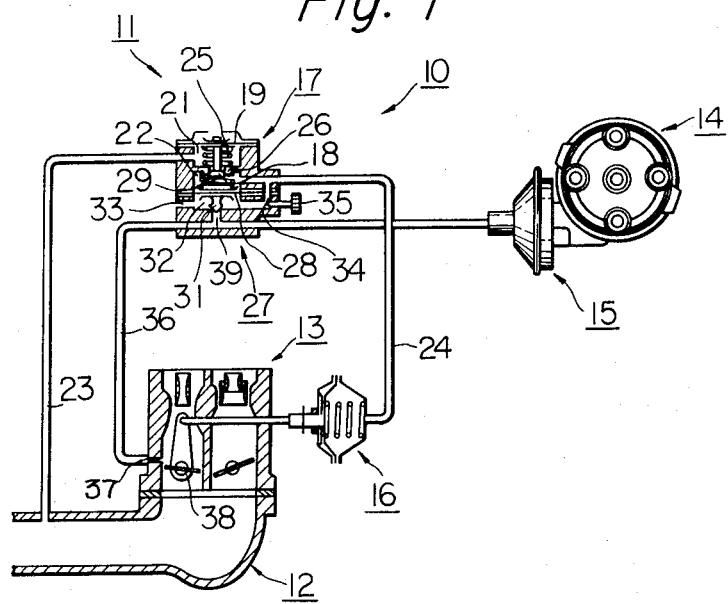

United States Patent
Harada et al.

[15] 3,677,238
[45] July 18, 1972

[54] CONTINUOUS VACUUM ADVANCE SYSTEM OF IGNITION TIMING

[72] Inventors: Motoo Harada, No. 2-19-2 Midorigaoka, Meguro-ku, Tokyo; Kenichi Sasaki, Sakonyama Danchi 3-5-204, No. 157, Kodaka-cho, Hodogaya-ku, Yokohama City, both of Japan

[22] Filed: Jan. 28, 1970

[21] Appl. No.: 6,474

[30] Foreign Application Priority Data

Jan. 31, 1969 Japan......................................44/7916

[52] U.S. Cl. .......................................................123/117 A
[51] Int. Cl. ..................................................F02p 5/10
[58] Field of Search.......................................123/117.1, 117

[56] References Cited

UNITED STATES PATENTS

| | | |
|---|---|---|
| 3,139,079 | 6/1964 | Bettoni ..............................123/117 A |
| 3,252,450 | 5/1966 | Dietrich et al. .....................123/117 A |
| 3,472,213 | 10/1969 | Walker ...............................123/117 A |
| 3,486,491 | 12/1969 | White ................................123/117 A |
| 3,503,377 | 3/1970 | Beatenbough.....................123/117 A |

*Primary Examiner*—Laurence M. Goodridge
*Assistant Examiner*—Cort Flint
*Attorney*—McCarthy, Depaoli, O'Brien & Price

[57] ABSTRACT

A vacuum advance control system of ignition timing for reducing the hydrocarbon content of engine exhaust gases emitted especially during deceleration of a motor vehicle. The system is provided an advance control assembly composed of a vacuum operated sensing valve and a flow modulating needle valve cooperating with each other. The assembly operates in association with a conventional intake manifold, carburetor, distributor and distributor advance vacuum actuator in order to control continuously the level of the vacuum to be introduced into the actuator in response to the intake manifold vacuum which increases abruptly for the decelerating condition.

6 Claims, 2 Drawing Figures

Patented July 18, 1972

3,677,238

INVENTORS
MOTOO HARADA
BY KENICHI SASAKI
McCarthy, Densch & O'Brien
ATTORNEYS

CONTINUOUS VACUUM ADVANCE SYSTEM OF IGNITION TIMING

The present invention relates to an advance system of ignition timing of a motor vehicle and more particularly to a vacuum-controlled advance system adapted for reducing exhaust emissions of hydrocarbons especially during deceleration of the motor vehicle.

Hydrocarbons contained in engine exhaust gases are known to account largely for air pollution problems. In order to solve the problems, a number of attempts have been made, including an effort to improve the quality of combustion in the combustion chamber at all vehicle speeds and under all engine load conditions. The quantities of unburned or hydrocarbon content of engine exhaust gases vary remarkably according to the modes of vehicle operation. Experiments thus far conducted have revealed that the hydrocarbon content peaks up during deceleration. When, now, the motor vehicle slows down, the vacuum in the intake manifold increases abruptly to such an extent that the air-fuel mixture can no longer be compressed adequately. The burning or flame velocity is consequently reduced to invite incomplete combustion or misfiring, leaving the mixture partly unburned. To cope with such reduced burning or flame velocity, therefore, it will be advantageous to have the spark timing advanced to enable the mixture to stay in the combustion chamber for a prolonged period of time optimum for complete burning.

In order to achieve this end, there have been proposed two types of vacuum advance mechanisms. In one type of them, an additional distributor advance vacuum actuator is provided, which operates to advance the ignition timing solely during the deceleration in response to the increased intake manifold vacuum. The other type of the mechanisms is so arranged that the conventional distributor advance vacuum actuator is controlled by the vacuum exercised on the diaphragm thereof. The level of this vacuum is switched over from an atmospheric pressure to the intake manifold vacuum and vice versa with use of a suitable valve responsive to pressure variation. Drawbacks are, however, encountered by the prior art mechanisms. For one thing, the former must necessarily become complicated in construction because it involves the use of two advance vacuum actuators controlling indifferently of each other the advance angle of the distributor depending upon the different operating conditions. In the latter mechanism, on the other hand, it is sometimes difficult to attain an advance angle optimum for the decelerating operation as required of the engine at the very moment. This is because the advance angle is controlled by a so-called "two-valve" control action, often failing to attain an intermediate value optimum for the particular operation.

It is therefore a primary object of the present invention to provide an improved vacuum advance system of ignition timing for reducing the hydrocarbon content of internal combustion engine exhaust gases emitted especially during deceleration of a motor vehicle.

It is another primary object of the invention to provide a vacuum advance system having a novel advance control assembly composed of a vacuum operated sensing valve and a flow modulating needle valve cooperating with each other. The assembly communicates with both the intake manifold and the distributor advance vacuum actuator and controls continuously the level of the vacuum to be introduced into the actuator in response to the levels of the intake manifold vacuum.

The system according to the invention is, as will be appreciated from the following description, characterized in that the advance angle of a conventional contact-point distributor is controlled continuously to an appropriate value optimum for the complete combustion. To achieve this purpose, there is provided in the system an advance control assembly having a vacuum-operated sensing valve and a flow modulating needle valve formed integrally and cooperating with each other.

Figure 2:
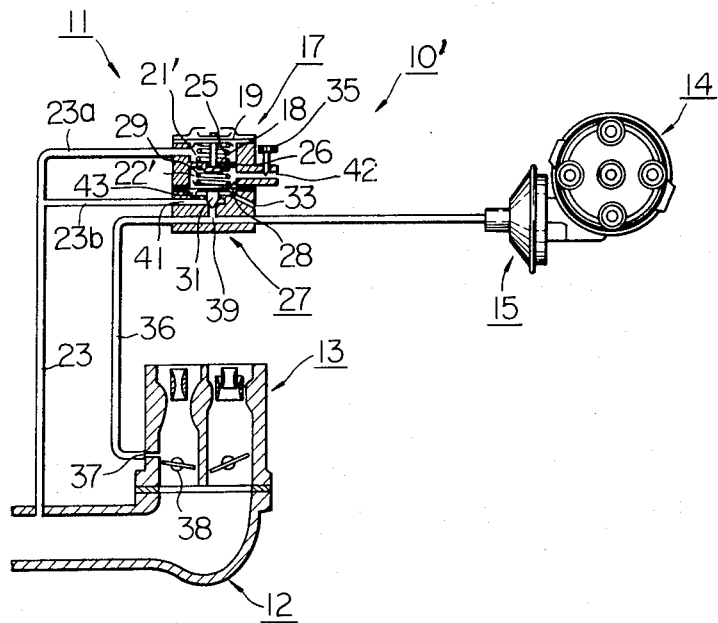

The present invention will be described in a greater detail in conjunction with the accompanying drawing in which:

FIG. 1 is a partially enlarged sectional view of the vacuum advance system implementing the invention; and FIG. 2 is similar to FIG. 1 but shows a modification of the vacuum advance system according to the invention.

In FIG. 1, the system of the invention which is generally denoted by 10 comprises an advance control assembly 11, which operates in association with a conventional intake manifold 12, carburetor 13, ignition distributor 14, and distributor advance vacuum actuator 15. The advance control assembly 11 operates in cooperation with a throttle valve control diaphragm device 16. The elements 12 to 15 are well known in the art and, as such, description thereof is herein omitted. The carburetor 13 is shown, by way of example, to be and not limited to of conventional dual type having primary and secondary sides.

The control assembly 11 has a vacuum-operated sensing valve 17 having a valve member 18 and diaphragm member 19 fixedly connected to the valve member 18 and two different chambers 21 and 22. The valve member 18 extends through a vacuum chamber 21 toward a pressure-varying chamber 22. The vacuum chamber 21 communicates with the intake manifold 12 by way of a conduit 23 and the pressure-varying chamber 22 with the chamber of the throttle valve control diaphragm device 16 by way of a conduit 24. The valve member 18 is movable toward and away from the chamber 22 by the diaphragm member 19 which is forced toward the position remotest from the chamber 22 by a return spring 25 to cause the valve member 18 to be normally forced against the stop 26 acting as a valve seat, as shown.

Between the vacuum-operated sensing valve 17 and modulating needle valve 27 is provided a second diaphragm member 28 which is forced away from the pressure-varying chamber 22 by a return spring 29. This diaphragm member 28 controls the motion of a flow modulating valve member 31. The modulating valve member 27 has an atmospheric chamber 32 vented to the atmosphere through a vent 33 and is thus maintained at a constant atmospheric pressure. The pressure-varying and atmospheric chambers 22 and 32, respectively, communicate with each other by way of a passage 34. If desired, an adjusting screw 35 may be mounted in the passage 34 for controlling the aperture thereof.

The distributor advance vacuum actuator 15 is constructed, for example, in a manner to cause the breaker-plate assembly (not shown) of the distributor 14 to rotate so as to permit continuous intermediate settings of the advance angle. The actuator 15 routes to the carburetor 13 through a conduit 36 which is opened through a spark advance vacuum port 37 into the carburetor 13 slightly upstream of the throttle valve 38. This conduit 36 passes through an introduction portion 39 of the modulating needle valve 27. The port 37, which is shown to open into the carburetor, may be opened into the intake manifold 12 depending upon the rotational position of the throttle valve 38. The throttle valve position is determined not only by an accelerator pedal (not shown) as usual but, in this particular embodiment of the invention, by the throttle valve control diaphragm device 16 by means of a rotary arm fixedly connected to the throttle valve shaft. This diaphragm device 16, when actuated by the vacuum drawn from the pressure-varying chamber 22 through the conduit 24, operates to rotate the throttle valve 38 clockwise, thereby causing the port 37 to communicate with the intake manifold 12.

When, now, the motor vehicle is driven at a normal cruising speed, the throttle valve 38 is fully or partially opened so that the vacuum in the intake manifold 12 is maintained at low levels, requiring no vacuum advance. In this instance, the vacuum in the vacuum chamber 21 is kept under a predetermined level that has been set in accordance with the compression of the return spring 25. Then, the valve member 18 is seated by the action of the spring 25, not providing for intercommunication between the two chambers 18 and 19. It therefore follows that the actuator 15 is internally kept at the pressure present in the secondary side of the carburetor 13.

When the motor vehicle starts to slow down, namely, at the initial stage of the deceleration, the intake manifold vacuum increases abruptly for such decelerating condition. This causes the vacuum in the vacuum chamber 21 to exceed the predetermined value, whereby the diaphragm member 19 is actuated due to the pressure difference between both sides thereof and the valve member 18 is withdrawn against the action of the return spring 25. This causes the pressure-varying chamber 22 to communicate with the vacuum chamber 21 so that air is pulled over from the chamber 22 thereinto. At this instant, the pressure in the throttle valve control diaphragm device 16 turns negative to rotate the throttle valve 38 clockwise past the spark advance vacuum port 37. As a result, the port 37 communicates with the intake manifold 12 and the pressure in the actuator 15 eventually becomes negative through the conduit 36. In this manner, the actuator 15 operates to produce the vacuum advance in the distributor 14.

It may happen that the spark timing is advanced excessively when the vacuum in the actuator 15 is too high for the proper advance. According to the present invention, such difficulty is eliminated by the operation of the modulating needle valve 27, in a manner discussed in the following.

When the pressure in the chamber 22 turns negative, the valve member 31 is retracted against the action of the return spring 29 due to the pressure difference between both sides of the diaphragm member 28, forming a passageway of air. This passageway is continuously controlled, by the modulating valve 27 which is tapered to act as a needle valve. Then, a regulated amount of air is allowed into the introduction portion 39 of the conduit 36 by way of the vent 33. The air thus drawn serves to lower the vacuum in the actuator 15. In this instance, the vacuum level in the pressure-varying chamber 22, which level is sufficiently high to actuate the diaphragm member 28, can be determined by varying the aperture of the passage 34 with use of the adjusting screw 35.

As has been described in detail, the vacuum in the actuator 15 can be controlled to a proper level ranging between the atmospheric pressure and intake manifold vacuum. The level of the actuator vacuum is, thus, determined to be optimum for the proper advance in terms of the position of the modulating needle valve 27. It should be appreciated as a feature of the present invention that the advance angle of the distributor 14 should be varied within a range optimum for the complete combustion of the air-fuel mixture especially during the deceleration, which feature is obviously different from the conventional two-value vacuum advance control mechanism.

FIG. 2 shows another embodiment of the invention, wherein the system 10' is substantially similar to that described in conjunction with FIG. 1 except that the pressure in the actuator 15 is held normally at atmospheric but becomes negative with a predetermined amount of air pulled over therefrom. For the sake of simplicity of discussion, like numerals of reference designate corresponding parts in FIG. 2; operation and function similar to those of the first embodiment can also be achieved in this second embodiment. This modified system 10' is, different from the system 10, constructed in such a manner that the throttle valve position is controlled by the accelerator pedal (not shown) alone. The conduit 23 leading from the intake manifold 12 is branched into two conduits 23a and 23b leading to the vacuum chambers 21' and 41, respectively, of the vacuum operated sensing valve 17 and of the modulating needle valve 27. Another difference of the construction of the advance control assembly is that the pressure-varying chamber 22' is vented to the atmosphere by way of a vent 42, which may be rendered adjustable with an adjusting screw 35 if preferred. The modulating valve member 31 is moved by the diaphragm member 28 due to the pressure difference between the two chambers 22' and 43, of which the atmospheric chamber 43 is vented from the atmosphere through a vent 33.

With these construction arrangements, when the vacuum within the chamber 21' reaches a predetermined level that is sufficiently high to overcome the compression of the return spring 25, the valve member 18 becomes unseated to turn the pressure in the chamber 22' negative. Although this chamber 22' is normally held at an atmospheric pressure through the vent 42, air delivered from the atmosphere through the vent 42 is sucked in by way of a passage formed between the valve member 18 and valve seat 26 at a rate surpassing the incoming air flow. As the consequence, the pressure in the chamber 22' turns negative at an elevated level. This can be achieved by reducing the aperture of or by throttling the vent 42 by manipulating the adjusting screw 35.

Thus, the modulating needle valve 27, which is normally kept closed, is opened by the operation of the diaphragm 28 when the pressure in the chamber 43 exceeds the pressure in the chamber 22'. As a result, the vacuum in the intake manifold 12 is passed over to the introduction portion 39 of the conduit 36 through the conduit 23 and branched conduit 23b. On the other hand, the throttle valve 38 is kept fully closed during deceleration so that the conduit 36 is internally maintained at an atmospheric pressure. With the modulating needle valve 27 opened, the intake manifold vacuum is delivered to the distributor advance vacuum actuator 15 through the conduits 23, 23b and 36 in this sequence. In this manner, the vacuum within the actuator 15 can be continuously controlled to a desired level for proper advance of ignition timing.

As will be apparent from the foregoing description, the advance angle of the distributor 15 can be set to a value optimum for the satisfactory combustion of the air-fuel mixture for the decelerating operation according to the present invention. It should be appreciated that the value can be varied continuously within a range from the atmospheric pressure to the intake manifold vacuum in order to meet with the required advance for the deceleration.

What is claimed is:

1. A system for a motor vehicle with an internal combustion engine having an ignition distributor, a carburetor and an intake manifold and for continuously controlling the advance angle of said distributor during deceleration of the motor vehicle to a value optimum for the satisfactory combustion of the air-fuel mixture, which system comprises a distributor advance vacuum actuator communicating with said carburetor by way of a conduit opening into said carburetor through a port slightly upstream of the throttle valve and an advance control assembly having a vacuum-operated sensing valve and a flow modulating needle valve both cooperating with each other, said vacuum operated sensing valve being operative responsive to the vacuum in the intake manifold to control the motion of said flow modulating valve for continuously controlling the pressure in said conduit and hence in said actuator to an optimum value ranging from an atmospheric pressure to the intake manifold vacuum in accordance with the position of said flow modulating valve during deceleration, said vacuum operated sensing valve being divided by a valve member and a diaphragm member mounted thereon into vacuum and pressure-varying chambers of which said vacuum chamber communicates with the intake manifold through a passageway and of which said pressure varying chamber communicates with a throttle valve control diaphragm device, said valve member being moved against a spring action due to the pressure difference between both sides of said diaphragm member when the vacuum level exceeds a predetermined level, and said flow modulating valve being combined integrally with said vacuum operated sensing valve through said pressure-varying chamber and has a needle valve member in an atmospheric chamber vented from the atmosphere, which chamber is separated from said pressure-varying chamber by a diaphragm member formed integrally with said needle valve member and forced by a spring action toward a position to cause said needle valve member to be seated and which communicates with said pressure-varying chamber by way of a passage, said atmospheric chamber opening into said conduit when said needle valve member is moved.

2. A system according to claim 1, wherein said throttle valve control diaphragm device communicates with said vacuum operated sensing valve for rotating the throttle valve past said port when actuated by the vacuum drawn to said pressure-varying chamber of said vacuum operated sensing valve from the intake manifold, whereby said port opens during deceleration into the intake manifold and said flow modulating valve forming part of said advance control assembly is opened in response to the vacuum in the intake manifold to cause a predetermined amount of air to be introduced into said conduit through said flow modulating valve in accordance with the position of said needle valve member when the vacuum level of the intake manifold exceeds a predetermined value.

3. A system according to claim 2, wherein an adjusting screw is mounted in said passage for controlling the aperture thereof.

4. A system for a motor vehicle with an internal combustion engine having an ignition distributor, a carburetor and an intake manifold and for continuously controlling the advance angle of said distributor during deceleration of the motor vehicle to a value optimum for the satisfactory combustion of the air-fuel mixture, which system comprises a distributor advance vacuum actuator communicating with said carburetor by way of a conduit opening into said carburetor through a port slightly upstream of the throttle valve and an advance control assembly having a vacuum-operated sensing valve and a flow modulating needle valve both cooperating with each other, said vacuum operated sensing valve being operative responsive to the vacuum in the intake manifold to control the motion of said flow modulating valve for continuously controlling the pressure in said conduit and hence in said actuator to an optimum value ranging from an atmospheric pressure to the intake manifold vacuum in accordance with the position of said flow modulating valve during deceleration, said vacuum operated sensing valve being divided by a valve member and a diaphragm member mounted thereon into vacuum and pressure-varying chambers of which said vacuum chamber communicates with the intake manifold through a passageway and of which said pressure-varying chamber is vented from the atmosphere by way of a vent, said valve member being moved against a spring action due to the pressure difference between both sides of said diaphragm member when the vacuum level in the intake manifold exceeds a predetermined level, and said flow modulating valve being combined integrally with said vacuum operated sensing valve through said pressure-varying chamber and has a needle valve member both in an atmospheric chamber and in a vacuum chamber communicating with the intake manifold, said atmospheric chamber vented from the atmosphere being separated from said pressure-varying chamber by a diaphragm member formed integrally with said needle valve member and forced by a spring action toward a position to cause said needle valve member to be seated and opening into said conduit when said needle valve member is moved.

5. A system according to claim 4, wherein said port opens during deceleration into the carburetor and a predetermined amount of air is pulled over from said conduit through said flow modulating valve in accordance with the position of said needle valve member when the vacuum level of the intake manifold exceeds a predetermined value.

6. A system according to claim 5, wherein an adjusting screw is mounted in said vent for controlling the aperture thereof.

* * * * *